US011052357B2

(12) United States Patent
Noth

(10) Patent No.: US 11,052,357 B2
(45) Date of Patent: Jul. 6, 2021

(54) DEPLOYABLE STIRRING MEMBER

(71) Applicant: NESTEC S.A., Vevey (CH)

(72) Inventor: Andre Noth, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 173 days.

(21) Appl. No.: 15/570,765

(22) PCT Filed: Apr. 28, 2016

(86) PCT No.: PCT/EP2016/059541
§ 371 (c)(1),
(2) Date: Oct. 31, 2017

(87) PCT Pub. No.: WO2016/177630
PCT Pub. Date: Nov. 10, 2016

(65) Prior Publication Data
US 2018/0117545 A1    May 3, 2018

(30) Foreign Application Priority Data
May 6, 2015    (EP) .................................... 15166523

(51) Int. Cl.
*B01F 7/00* (2006.01)
*A23G 9/22* (2006.01)
(Continued)

(52) U.S. Cl.
CPC ............ *B01F 7/00075* (2013.01); *A23G 9/12* (2013.01); *A23G 9/224* (2013.01); *A23P 30/40* (2016.08);
(Continued)

(58) Field of Classification Search
CPC .......................... B01F 7/00075; B01F 7/0005; B01F 7/00066; A47J 43/1093; A47J 43/07
See application file for complete search history.

(56) References Cited

U.S. PATENT DOCUMENTS 2,571,316 A    10/1951   Van Guilder
7,441,940 B2 *  10/2008   Vanek ................. B01F 7/00075
                                                  366/129
(Continued)

FOREIGN PATENT DOCUMENTS

EP        2225981      9/2010
GB        2475542      5/2011
(Continued)

*Primary Examiner* — Elizabeth Insler
(74) *Attorney, Agent, or Firm* — K&L Gates LLP

(57) ABSTRACT

The invention relates to a stirring member (9) for using in a system for preparing a food product, the product being prepared by the stirring member (9) moving inside a container (8), the stirring member (9) being configured in such a way that it can adopt different configurations depending on its direction of rotation inside the container (8). Preferably, the stirring member (9) can adopt a spoon configuration or a whisk configuration. The invention further relates to a method for using such a stirring member (9) in a system for preparing a food product, the method varying the direction of rotation of the stirring member (9) so that it adopts a different configuration depending on the type of product prepared in the container (8).

9 Claims, 4 Drawing Sheets

(51) Int. Cl.
*A47J 43/10* (2006.01)
*A23P 30/40* (2016.01)
*A23G 9/12* (2006.01)
*B01F 15/06* (2006.01)
*B01F 15/00* (2006.01)

(52) U.S. Cl.
CPC ......... *A47J 43/1093* (2013.01); *B01F 7/0015* (2013.01); *B01F 7/00333* (2013.01); *B01F 7/00583* (2013.01); *B01F 15/00019* (2013.01); *B01F 15/065* (2013.01); *B01F 2015/061* (2013.01); *B01F 2215/0021* (2013.01); *B01F 2215/0026* (2013.01)

(56) References Cited

U.S. PATENT DOCUMENTS

| | | |
|---|---|---|
| 2005/0028386 A1 | 2/2005 | Hughes |
| 2005/0088907 A1 | 4/2005 | Vanek |
| 2013/0340456 A1* | 12/2013 | Hoare ................ B01F 7/00033 62/126 |

FOREIGN PATENT DOCUMENTS

| | | | | |
|---|---|---|---|---|
| GB | 2475542 A | * | 5/2011 | .......... A47J 43/1093 |
| WO | 9107878 | | 6/1991 | |

* cited by examiner

DEPLOYABLE STIRRING MEMBER

CROSS REFERENCE TO RELATED APPLICATIONS

The present application is a National Stage of International Application No. PCT/EP2016/059541, filed on Apr. 28, 2016, which claims priority to European Patent Application No. 15166523.9, filed on May 6, 2015, the entire contents of which are being incorporated herein by reference.

FIELD OF THE INVENTION

The present invention is directed to a system for preparing a product, preferably cooled aerated confectionary such as ice cream or whipped yogurt; particularly, the invention is directed to a deployable stirring member actuating in the system.

BACKGROUND OF THE INVENTION

Currently, the majority of ice cream consumption at home concerns products bought frozen at the point of sales. As for dairy products, there are several drawbacks such as the need to transport the products at home rapidly in order to keep them at the cold (frozen) state, the need to store them in a freezer and the limited number of flavors available considering standard freezer volume. Additionally, the texture of such products is rather hard and far from the freshly made ice cream.

An alternative solution available today is the use of an ice cream machine to produce fresh ice cream. Thereby, although the obtained texture of the resulting product is more satisfactory, the preparation procedure by means of the known ice-cream machines has several drawbacks.

In particular, all the ingredients must be mixed previously, the volume of such machines corresponds usually to five or more serving portions of the same flavor and the time necessary is about half of an hour. Moreover, the ingredients necessary for the preparation come in contact with a large number of parts of the preparation machine (e.g. a stirrer, tanks, or a dispenser), which all have to be cleaned. Other alternatives imply a preparation at ambient temperature before the freezing phase in a standard freezer. Hence, they are also time consuming and require cleaning tasks.

Therefore, there is a demand for increasing the convenience of the preparation of cool confectionery or desserts, in particular, reducing the preparation time, avoiding the hassle of cleaning the surfaces in contact with food and delivering on demand an appealing texture and diversity of products.

US 2006/0263490 for example relates to a frozen confectionary maker comprising a cup holder for removably receiving a cup with a cavity in its wall and base for receiving freezable solution. The cup of the confectionary maker is designed to serve for the preparation and serving of the cup. WO 2010/149509 for example relates to a system for preparing a frozen confectionary, the system comprising a cylindrical container for being inserted into a dedicated preparation device, said container comprising a predefined amount of ingredients. The device of the system comprises a container holder having an inner heat exchange surface designed for being in tight contact with the container when being placed in the container holder and a delivery outlet for serving the single portion prepared within the container to a dedicated receiving receptacle.

Moreover, it is to be taken into consideration that, in the domain of food and drink dispensing machines, one demand that is becoming a standard is the absence of cleaning after the preparation: one way to ensure a fully clean preparation of the product delivered consists in avoiding any product transfer by both processing and delivering the product in its initial container. In this regard, one of the processes that can be applied to the initial ingredients to obtain the final product is heat transfer (heating and/or cooling). In the present case where no product transfer is allowed, the most obvious way to achieve this heat transfer is by using conduction through the packaging. This is for example done through the evaporator of a vapor compression refrigeration circuit for cooling. Therefore, it is common that during the preparation process in the known devices, a heat transfer is generally obtained between the container body holding the ingredients and the inner heat exchange surface of the device by means of conduction through the outer body of the container.

Document WO2014/067987 belonging to the same applicant describes a system for preparing desserts in cups that are prefilled with product and cooled through a thermally conductive packaging material. The system comprises a stirring member which is made to stir inside the cup in such a way that the dessert is prepared. The range of products that can be made in such a system is very large and can go:
- from frozen ice-cream, in which case the stirring member has the shape of a spoon and requires to be provided with strength to manage the high torques needed to move within the product, which has an elevated viscosity;
- to chilled whipped yoghourt, in which case the stirring member has the shape of a whisk, this shape being necessary for integrating a significant amount of air into the product and for creating shear stresses in the product to configure the whipped yoghourt, so a whisk shape is needed as a spoon shape is not efficient in this case.

Therefore, in such systems and in other similar ones, the stirring member needs to be shaped or configured differently (as a spoon or as a whisk) in order to correctly prepare the required product, typically ice-cream or whipped yoghourt. The drawbacks of using a different stirring member, i.e. a spoon or a whisk, depending on the product that is going to be prepared, are double:
- First of all, it adds complexity to the user's experience, as the user has to select himself, depending on the product to be prepared, the correct stirring member: a misuse will lead to an unexpected in-cup result that might be perceived very negatively by the user not aware of his misuse. Preventing it by adding identification means to sense which stirring member is used and warn in case of incompatibility also adds technical complexity and costs to the machine.
- Secondly, in the case of whipped yoghourt prepared with the whisk, it is well known that the viscous product will stick and stay in-between the whisk wires, even when removing the whisk from the preparation container. Removing this product by hand adds complexity and represents a strong drawback for the user's experience.

It is known from the state of the art document U.S. Pat. No. 6,206,561 B1 describing a collapsible wire whisk comprising a handle and a wire basket with a plurality of wires slidably and twistably mounted within the handle. The whisk can be deployed when it is going to be used and it can be collapsed and made flat for easy storage. No double shaping or configuration of the whisk (into a whisk and also a spoon) can be obtained by such a configuration and besides, there is no automatic possible deployment of this whisk, which is manually actuated by acting on the handle and applying a torque on it. A similar document is for example EP 1437078 A2 where a collapsible whisk is described, the whisk being able to be made flat for storage, as space is highly minimised. However, none of these documents can provide a solution to a multiple configuration of the stirring member depending on the product targeted. Moreover, none of these documents actually disclose any similar or close problems to the ones the present invention is aimed at solving.

The present invention thus aims at providing a stirring member in a system for preparing cooled confectionary that is able to automatically adopt different configurations adapted to the confectionary product to be prepared, such that it is simple, allows no misuse from the user's side and avoids that any product remains deposited in the stirring member with the consequent need for a later cleaning.

OBJECT AND SUMMARY OF THE INVENTION

The present invention seeks to address the above-described problems. The invention also aims at other objects and particularly the solution of other problems as will appear in the rest of the present description.

According to a first aspect, the invention refers to a stirring member for using in a system for preparing a food product, the product being prepared by the stirring member moving inside a container, the stirring member being configured in such a way that it can adopt different configurations depending on its direction of rotation inside the container. Preferably, the stirring member can adopt a spoon configuration or a whisk configuration.

According to the invention, the stirring member typically comprises a main stirring member and one or a plurality of rotating stirring bodies rotatable within a certain angular travel with respect to the main member.

Preferably, the angular travel of the rotating stirring bodies with respect to the main stirring member is defined as a function of the amount of air incorporated in the product.

According to the invention, the different configurations of the stirring member can be adopted by a driving torque applied on the main stirring member and by induced torques on the rotating stirring bodies in opposite direction to the driving torque induced by the movement of the stirring member in the product.

The stirring member typically further comprises guiding means for guiding and limiting the angular travel of the rotating stirring bodies with respect to each other and/or with respect to the main stirring member.

Typically, the guiding means comprise at least one pin moving inside at least one slot.

The guiding means can also be made by configuring the shapes of the main stirring member and of the rotating stirring bodies so that they enter in contact only at defined angular positions.

Also, the stirring member can further comprise blocking means that can be activated to block one configuration of the stirring member once the stirring member is removed from the system.

According to a second aspect, the invention refers to a method for using a stirring member in a system for preparing a food product as the one that has been described, the method varying the direction of rotation of the stirring member so that it adopts a different configuration depending on the type of product prepared in the container.

Preferably, the direction of rotation of the stirring member is varied a plurality of times during a recipe preparation of a certain type of product, as a function of the type of product.

Preferably, according to the invention, the configuration adopted by the stirring member and/or the rotational speed of the stirring member and/or the time while the configuration and/or the rotational speed are maintained.

Typically, the method of the invention further comprises a further blocking a final configuration of the stirring member at the end of the food product preparation process.

Preferably, the final configuration blocked in the stirring member is that of a spoon shape.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
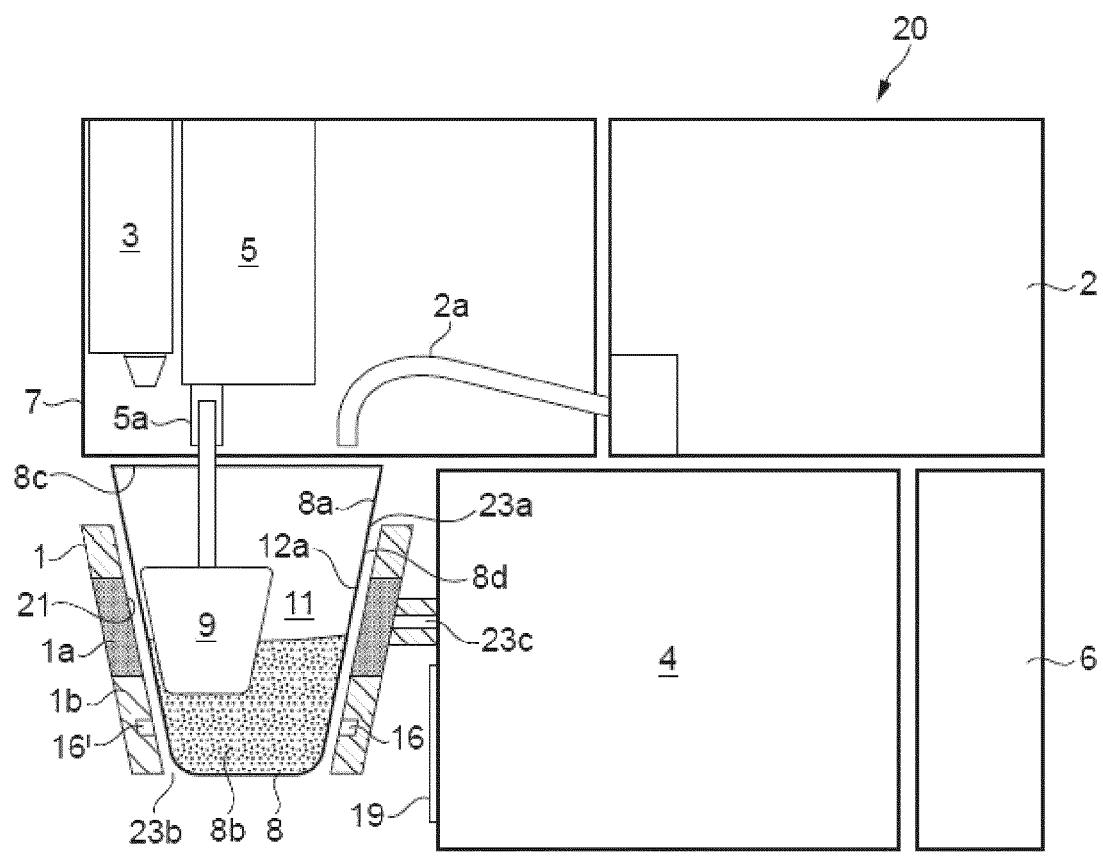
FIG. 1 shows a schematic view of the system for preparing a cooled confectionary product according to the present invention.

FIG. 1 relates to a preferred embodiment of a system according to the present invention comprising a container 8 and a food preparation machine 20 designed for preparing a frozen confectionary in the container 8. According to the invention, preferably an aerated and cooled confectionary such as ice cream or whipped yogurt is prepared in the container 8.

Preferably, the container 8 will be configured as a single-use container and will typically comprise inside at least part of the ingredients for the preparation of the final product; according to a different embodiment, and also comprised within the scope of the present invention, the ingredients can be dispensed into the container 8 coming from a dispensing container. In one way or the other, the ingredients will be finally processed in the container 8.

The machine 20 preferably comprises a receiving seat 1 for receiving the container 8 therein. The receiving seat 1 is preferably shaped in V-form or truncated conical form when seen in sectional side view as indicated in FIG. 1. Thereby, the receiving seat 1 preferably comprises an insertion opening 23a in which the container 8 may be placed, as well as a lower opening 23b enabling the accommodation of containers of various sizes. Further, the receiving seat 1 is preferably formed as an annular ring portion. The receiving seat 1 is preferably connected to a housing of the machine by dedicated support means 23c. According to such an embodiment, containers 8 of different sizes respectively volumes may be supported by the receiving seat 1.

The preparation machine 20 further comprises a cooling unit 4 connected to a heat exchange element or cooling element 1a that is preferably connected to or integrally formed with the receiving seat 1 of the machine 20. The heat exchange element 1a is preferably an evaporator fluidically connected to the cooling unit 4 of the machine. The heat exchange element 1a thus serves as a heat exchanger that withdraws the heat energy from the container 8 and its enclosed confectionary product to lower rapidly the temperature of the product contained in the container.

The heat exchange element 1a is preferably shaped to overlap with and be arranged adjacent to an outer wall surface 8d and a heat exchange wall portion of the container 8 when the container is placed in the receiving seat 1 of the machine.

The heat exchange element 1a comprises a heat exchange contact surface 21 that is arranged to be in contact with the outer wall surface 8d of the container when the container 8 is placed in the machine. Thereby, the heat exchange contact surface 21 is arranged at an inner surface of the receiving seat 1. The heat exchange contact surface 21 of the heat exchange element 1a and the heat exchange wall portion of the container 8 are preferably complementary shaped.

The heat exchange element 1a is preferably of a material that provides excellent heat transfer properties, preferably metal such as stainless steel, copper or aluminium. Accordingly, the heat transfer between the container 8 and the heat exchange element 1a is significantly enhanced.

As shown in FIG. 1, the container receiving seat 1 is preferably only partially composed of the heat exchange element 1a. The receiving seat 1 preferably further comprises a thermally insulating portion 1b made from material with a lower thermal heat capacity such as e.g. a polymer or plastic material. According to such an embodiment, the thermal inertia and thus energy losses are reduced, which allows a faster cooling of the container 8. The thermally insulating portion 1b further serves to insulate sensing means from the external environment, in a tight manner against the wall of the container, so that a more accurate product temperature is obtained.

The machine 20 preferably comprises a control unit 6 for controlling the operations of the components of the machine. The control unit 6 is preferably connected at least to the cooling unit 4 and to temperature sensing means.

The cooling unit 4 of the machine 20 is adapted to cool the heat exchange element 1a. Since the heat exchange element 1a comprises excellent heat conductivity, the container 8 and in particular the heat exchange wall portion 12 of the container 8 when being in contact with the heat exchange element 1a is effectively cooled. The cooling unit 4 can comprise any refrigeration and/or circulatory heat transfer system to cool the heat exchange element 1a, the heat exchange wall portion 12 and consequently the container 8 as rapidly as possible.

Optionally, the machine 20 may further comprise a liquid tank 2 for holding liquid such as e.g. water and a dedicated pump. The liquid tank 2 may be connected to liquid dispensing means 2a for providing liquid to the container 8 when being placed within the receiving seat 1 of the machine 20. The liquid tank 2 may be necessary when the initial product is powder, gel or liquid concentrate and so requires dilution according to a predetermined dilution ratio for achieving the final product with the correct texture.

Furthermore, the machine 20 may comprise one or more topping reservoirs 3 and an associated valve or pump (not shown) for providing toppings in solid or liquid form to the product 8b. The toppings may be liquid coulis, liquid chocolate, honey, caramel or solid products like crisps, flakes, chocolate bits. Additionally, the toppings may be liquefied by means of an additionally provided heating source such as e.g. melted chocolate.

The machine 20 further comprises a stirring unit 5 adapted to connect to a stirring member 9 and driving it in a combined movement (as will described in more detail later on). For this reason, the stirring unit 5 is preferably equipped with connection means 5a designed for selectively connecting to the stirring member 9. The stirring member 9 may either be part of the machine 20 or be provided as part of the container 8 (integral or part to it).

The topping reservoirs 3 and the stirring unit 5 are preferably mounted on a mobile structure 7 of the machine in order to allow the insertion and removal of the container 8 into and from the container receiving seat 1. The mobile structure 7 is thus adapted to be moved relatively to the rest of a housing of the machine 20 from a closing position (shown in FIG. 1) to an open position (not shown). Thereby, the movement of the mobile structure 7 with respect to the rest of the machine 20 may be rotation and/or translation.

In the following, the basic working principle of the machine for preparation of frozen or cooled confectionary will be explained.

First, the mobile structure 7 of the machine 20 is brought into its open position in which a container 8 from which a lid member provided to close a central opening 8c of the container 8 has been removed is inserted in the receiving seat 1. In the open position, the stirring member 9 may be manually connected to the stirring unit 5 of the machine.

The mobile structure 7 is then brought into its closed position in which the stirring unit 5 and the topping reservoirs 3 are lowered towards the container 8. In this position, the stirring member 9 is brought into a position adjacent to an inner surface 12a of the container 8.

The product within the container 8 will then be cooled by means of the heat exchange element 1a interacting with the outer wall surface 8d of the container and preferably with the heat exchange wall portion 12 thereof. At the same time, the stirring unit 5 may provide a motion of the stirring member 9 within the container 8.

The operation of the heat exchange element 1a is preferably set in response to a temperature detected by temperature sensing means (not shown). Thereby, the general operation such as an on/off state of the heat exchange element 1a as well as the particular cooling temperature may be set in response to the temperature measured by said temperature sensing means.

During the preparation process, liquid or solid toppings may be added from the topping reservoirs 3 to the main product within the container 8. This preferably takes place close to the end of the preparation process such that liquid toppings will create an appealing visual swirl for the consumer and solid toppings will remain crispy.

When a predefined cooling temperature is reached and sensed by the temperature sensing means, the cooling operation is preferably stopped or reduced to hold the product at the optimal serving temperature.

The mobile structure 7 of the machine 20 is then brought into its open position such that the container 8 may be removed from the receiving seat 1. The stirring unit 5 may be adapted to disconnect from the stirring member 9 when bringing the mobile structure 7 in an open state. The stirring member 9 is preferably left in the final product within the container 8 and is configured in its final state as a spoon so that it can be used for consumption of the prepared confectionary 8b. The container thus serves at the same time as initial container, process container and final container during the preparation of the frozen confection. Accordingly, no cleaning operations of the components of the machine are necessary.

According to the invention, different containers may be provided each of which enclose a different volume such as 300 ml, 200 ml or 150 ml, for example. Dependent on the product to be prepared by the respective container 8, the size and volume of the container 8 is adapted to contain a predefined amount of ingredients necessary for preparing the specific product (in the embodiments where the containers are configured as single-serve ones comprising at least part of the ingredients inside). The containers preferably comprise a shelf-stable comestible ingredient. In addition, the container may further comprise a gaseous phase such as e.g. air which is enclosed in a compartment 11 by means a lid member (not shown). In a preferred embodiment the amount of confectionary ingredients preferably ranges from 20 to 60% of the provided volume of the container. The rest of the container may be filled with gas. Alternatively or additionally, nitrogen can be provided within the container for aseptic filling and extended shelf life.

As already mentioned, a lid member (not shown) is preferably provided to each of the containers in order to close off aperture 8c of the container and thus, to enclose the ingredients therein, in the preferred embodiment for single-use containers.

The containers 8 have preferably an essentially conical shape. Alternatively, the container may as well have an essentially curved shape. According to such a shape of the container 8, an extension and/or retraction of the container body 8a due to variation of temperature will not negatively affect the proper support of the container 8 within the receiving seat 1 of the machine 20. In particular, a tight support between the container 8 and the receiving seat 1 and thus a close contact between the heat exchange wall portion 12 and the heat exchange element 1a is ensured.

The machine 20 may further comprise torque sensing means (not shown) connected to the control unit 6. Thereby, the control unit 6 which is adapted to control the stirring unit 5 and in particular the rotational speed and the electrical current of a dedicated motor thereof, may sense the torque which is proportional to the electrical current. Accordingly, the viscosity of the product to be prepared within the container 8 can be detected by the control unit 6 in order to monitor the preparation process and detect whether the product within the container is ready for consumption.

The control unit 6 may further be designed to control the stirring unit 5 in response to a temperature measured by temperature sensing means. The control of the stirring unit may be its velocity and/or its rotational direction.

The stirring member 9 according to the present invention can adopt either a spoon shape (see FIG. 2a) or a whisk shape (see FIG. 2b) depending on the driving direction of the stirring member 9. Therefore, automatically, depending on the direction under which the stirring member 9 is rotated, it will adopt one shape or the other; this will avoid the drawbacks and problems occurring in the known prior art and that have been mentioned before:

Only one stirring member is used, so no complexity is added to the system, any misuse is avoided and the results are guaranteed.

At the end of a preparation requiring the whisk shape, the stirring member 9 is turned back to its spoon shape so that no product stays in-between the whisk wires, as it was the case in the known prior art.

Even more, the stirring member 9 of the invention additionally helps to aerate the product when an ice-cream product is being made, more efficiently and at higher overrun than that a simple spoon shape would have allowed.

In the known stirring members of the prior art, typically configured as a whisk, the action of opening and closing them (deploying them or making them flat) is done manually by the user, acting on the whisk handle. However, in the present invention, the opening or deployment of the stirring member 9 is done automatically and not using an additional torque applied on the handle, but using the resistance torque of the product itself, as it will be further explained. Also, the target is to have a spoon (in initial positioning of the stirring member 9 and once it has been plied again) configured having a spoon shape and not necessarily being flat.

Therefore, the stirring member 9 according to the invention is configured in such a way that it can adopt different configurations depending on its direction of rotation inside the container 8. These configurations typically differ by the torque they apply to the product and/or by the amount of air they incorporate in the product. The stirring member 9 is preferably configured to adopt a spoon configuration or a whisk configuration.

Typically, it is the rotation of the stirring member 9 around its own axis (spin rotation) which allows the change of configuration of the stirring member 9, depending on the direction of this rotation. The rotation of the stirring member 9 around the axis of the container 8 (gyration) can either further help the adoption of one or another configuration by the stirring member 9 or can limit it in a certain way, depending on the direction of said gyration. This can be understood by looking at FIG. 3c or 3d, for example.

The products made in the system of the invention are preferably cooled products, more preferably aerated and cooled confectionary such as ice cream or whipped yoghurt. However, the deployable stirring member 9 can also be used for preparing other types of products, hot and/or ambient products, such as pastry, cakes, hot aerated sauces, etc. in general, any kind of product that is better aerated and mixed by the use of the stirrer of the invention.

The deployable stirring member 9 of the present invention comprises:

A main stirring member 91 which is the part that will be inserted in the driving shaft or stirring unit 5 of the machine 20 and will be driven by it.

One or more rotating stirring bodies 92, linked to the main stirring member 91 or to other rotating bodies so that a rotation is allowed within a certain angular travel, or so that a translation is allowed within a certain linear travel, or a combination of the two.

Figure 2A:
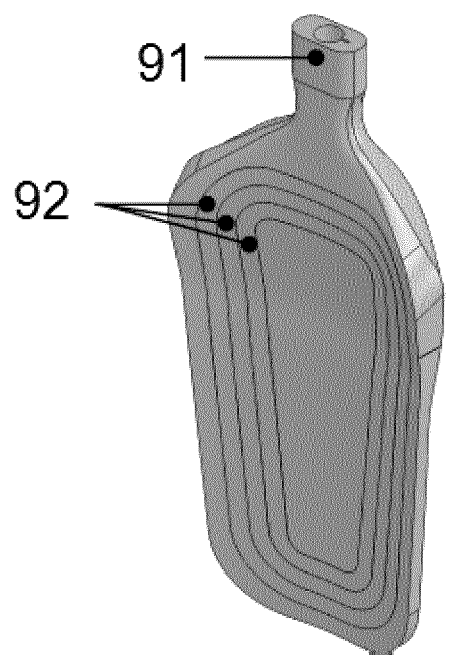
FIGS. 2a-b show views of the deployable stirring member according to the present invention, in a closed configuration and in a deployed configuration, respectively.
Figure 2B:
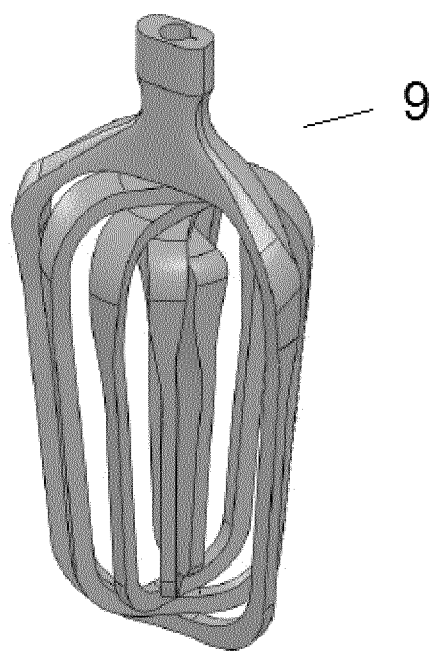

FIG. 2a shows the positioning of the stirring member 9 configured as a spoon, the rotating stirring bodies 92 not being deployed: this configuration is typically adopted at the initial positioning of the stirring member 9 and also at the end of the process, when the stirring member 9 configured as a spoon (thus, having a shape which is not flat) will be used for consuming the prepared confectionary product. FIG. 2b shows the stirring member 9 deployed, configured and shaped as a whisk. As already previously discussed, the shape or configuration adopted by the stirring member 9 will also depend on the type of product that is made, typically:

frozen ice-cream, in which case the stirring member 9 will take the shape of a spoon as strength to manage the high torques is needed to move inside the product, which has an elevated viscosity;

chilled whipped yoghourt, in which case the stirring member 9 adopts the shape of a whisk, this shape being necessary for integrating a significant amount of air into the product and for creating shear stresses in the product to configure the whipped yoghourt, a spoon shape not being efficient in this case.

When a driving torque 200 is applied by the stirring unit 5 on the main stirring member 91, induced torques 300 with the opposite sign (i.e. in opposite direction) are induced on the rotating stirring bodies 92, mainly due to the product viscosity that offers a certain resistance to the movement of the stirring member 9 within the product, but also due to the own inertia of the rotating stirring bodies 92. This has been exemplified in FIGS. 3a to 3d attached.

When the stirring unit 5 drives the main stirring member 91 in counter clockwise direction (i.e. the driving torque 200 on the main stirring member 91 is applied in counter clockwise direction), induced torques 300 are applied on the rotating stirring bodies 92 in clockwise direction. The rotating stirring bodies 92 reach the corresponding stops in their clockwise movement (as it will be further explained in more detail), so the stirring member 9 remains configured and shaped as a spoon (see FIGS. 3a and 3b).

On the other hand, when the main stirring member 91 is driven in a clockwise direction by the stirring unit 5 (i.e. the driving torque 200 on the main stirring member 91 is applied in clockwise direction), induced torques 300 are applied on the rotating stirring bodies 92 in counter clockwise direction. Similarly, the rotating stirring bodies 92 reach the corresponding stops in their counter clockwise movement (as it will be further explained in more detail), so the stirring member 9 remains configured and shaped as a whisk (see FIGS. 3c and 3d).

The above-mentioned examples represent solutions and possible configurations of the stirring member 9 of the invention. However, other solutions are possible, as for example the inverse configuration, where the stirring member 9 is configured in such a way that the counter clockwise rotation of the main stirring member 91 leads to it being configured into a whisk shape, whereas the clockwise rotation of the main stirring member 91 will lead to it being configured as a spoon.

Figures 3C, 3D:
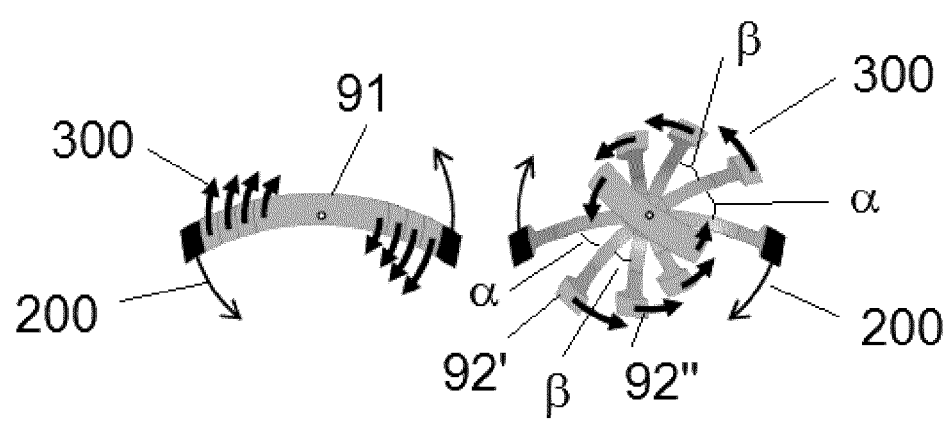
Figure 4A:
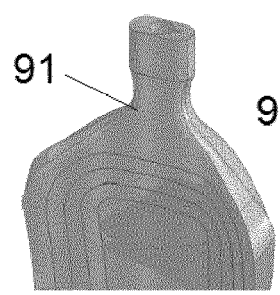
FIGS. 4a-c show the configuration of mechanical stops used to limit the movement of the stirring member parts when being deployed.
Figure 4B:
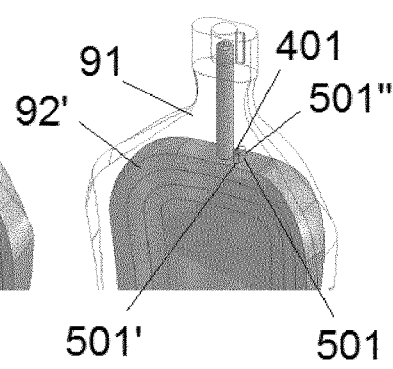

As further represented in FIGS. 4a, b, c the relative movement of the rotating stirring bodies 92 with respect to each other and/or with respect to the main stirring member 91 is guided and limited by means of pins moving inside corresponding slots, according to a preferred embodiment of the invention. FIG. 4a represents for example an initial positioning of the stirring member 9 configured as a spoon. The movement between a first rotating stirring body 92' and the main stirring member 91 is defined and guided by a primary pin 401 attached to the first rotating stirring body 92' which moves inside a primary slot 501 arranged in the main stirring member 91. Therefore, the movement of the first rotating stirring body 92' with respect to the main stirring member 91 is limited by the end parts 501' and 501" in this primary slot 501. As such, the movement of the first rotating stirring body 92' in the clockwise direction is limited to the position shown in FIG. 4b, by the end part 501', and is made in this example to make the first rotating stirring body 92' being over the main stirring body 91, so no relative displacement angle exists between them: this configuration is intended, as represented in FIG. 4b, when the stirring member 9 is configured as a spoon. The movement of the first rotating stirring body 92' in the counter clockwise direction is limited by the end part 501" and it can be configured to provide a certain angle α for example, between the first rotating stirring body 92' and the main stirring member 91, as shown for example in FIGS. 3c and 3d (whisk configuration).

Figure 4C:
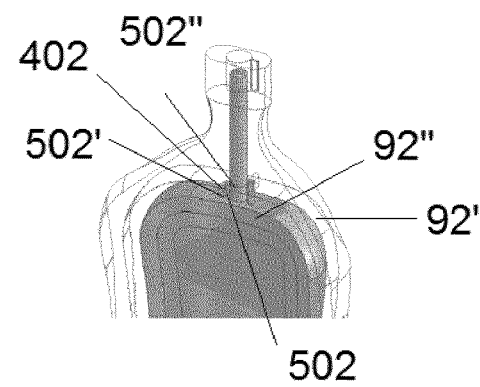

Similarly, the movement between a second rotating stirring body 92" and the first rotating stirring body 92' is defined and guided by a secondary pin 402 attached to the second rotating stirring body 92" which moves inside a secondary slot 502 arranged in the first rotating stirring body 92'. Therefore, the movement of the second rotating stirring body 92" with respect to the first rotating stirring body 92' is limited by the end parts 502' and 502" in this secondary slot 502. As such, the movement of the second rotating stirring body 92" in the clockwise direction is limited to the position shown in FIG. 4c, by the end part 502', and is made in this example to make the second rotating stirring body 92" being over the first rotating stirring body 92', so no relative displacement angle exists between them: this configuration is intended, as represented in FIG. 4c, when the stirring member 9 is configured as a spoon. The movement of the second rotating stirring body 92" in the counter clockwise direction is limited by the end part 502" and it can be configured to provide a certain angle β for example, between the second rotating stirring body 92" and the first rotating stirring body 92', as shown in FIGS. 3c and 3d (whisk configuration). In this position, the second rotating stirring body 92" will be arranged under an angle (α+β) with respect to the main stirring member 91. Different respective angular movements between the rotating stirring bodies 92 can be configured, according to the present invention.

Figures 3A, 3B:
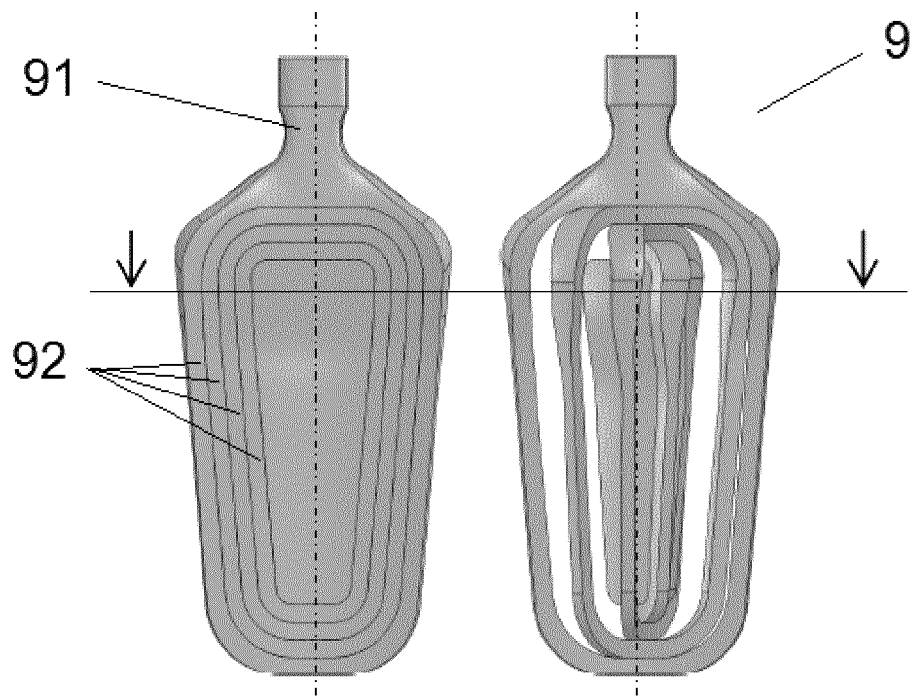
FIGS. 3a-d show front and section views of a stirring member according to the present invention, in closed and deployed configurations, also showing the forces acting on them.

The pins and slots are preferred configurations for the stirring member 9 of the present invention, precisely defining the angular movement of the rotating stirring bodies 92 with respect to each other and with respect to the main stirring member 91, as represented in FIGS. 3a-b-c. However, it should be also comprised within the scope of the present invention any other mechanical configuration providing a similar result, i.e. precisely guiding and limiting these angular movements. Another possible embodiment for these mechanical guiding means would be to effect in a simple way through the shape of the main stirring member 91 and that of the rotating stirring bodies 92 so that they enter in contact at defined angular positions. This embodiment provides advantages, such as:
  reduced number of parts (only one pin for the central axis, i.e. the main stirring member 91);
  simple assembly (no pins);
  low cost;
  more hygienic solution as the slots in which the pins travel are removed (the slots where the pins move can be places where product can gather and which are difficult to clean).

The benefits of the deployable stirring member being differently configured are evident when it is used in the machine: however, it would also be desirable that, once the stirring member 9 has been released by the machine, when the product preparation has finished, that the stirring member 9 is once again configured as a spoon, so that the user can consume (eat) the product with it easily. This can be made with a mechanical system that:
  allows to switch between the configurations of the spoon and the whisk when the stirring member 9 is inserted in the machine, thanks to a specific part of the machine that enables this switch, and
  prevents the switch between these configurations when the stirring member 9 is not arranged in the machine.

To enable this function, the stirring member 9 according to the invention preferably comprises blocking means (not shown) which are activated (i.e. activating its blocking function) only once the stirring means have been removed from the machine, once the cooled food product has been prepared. Typically, once the food product preparation has ended, the stirring member 9 is rotated accordingly to be configured as a spoon, so that the user can consume the product directly with it. It is in this moment that the blocking means are activated so the spoon shape configuration remains, independently on any further rotation of the stirring member 9 that can occur outside the machine.

According to another aspect, the invention further refers to a method for using a stirring member 9 in a system for preparing a frozen confectionary according to the present invention: the method is generally based on changing the configuration of the stirring member 9 (whisk or spoon) depending on the direction of rotation of the stirring member 9, in particular depending on the direction of rotation of the main stirring member 91. Therefore, by changing the direction of rotation of the stirring member 91, optimal benefit is taken from the stirring member capabilities. According to the invention, as the changing of configuration of the stirring member 9 is simple (only requires the change of direction of the main stirring member 91) it can be also changed a plurality of times, as many as required, during the recipe preparation steps of a certain type of product, in order to optimize the final product delivered.

Two typical examples are presented to illustrate the method of the invention, as it follows.

Making an ice cream product.

Step 1. Decreasing temperature: the stirring member 9 is configured as a spoon, rotating at medium speed to ensure a homogenous cooling of the product with very low risk of splashes in this phase as the product is still very liquid.

Step 2. Foaming: when a temperature of around 0° C. is reached, the stirring member 9 is configured as a whisk, rotating at medium speed which allows well integrating the air in the product thanks to the high shear stress forces, obtaining overrun values that could not be obtained with a spoon shape. This step can last a certain amount of time, defined by each product type and by the overrun targeted.

Step 3. Freezing: the stirring member 9 is again configured as a spoon; the ice cream product is brought to the frozen final state before the machine opens to allow the user consume and enjoy the final product prepared.

Making a whipped yoghourt product.

Step 1. Decreasing temperature: the stirring member 9 is configured as a spoon, rotating at medium speed to ensure homogenous cooling of the product with very low risk of splashes in this phase where the product is still very liquid.

Step 2. Foaming: when the temperature of the product has reached about 0° C., the stirring member 9 is configured as a whisk and rotates at medium speed allowing to well integrate the air into the product, thanks to the high shear stress and obtain overrun values that could not be obtained with the spoon shape. This step can last a certain amount of time, depending on the product and the overrun targeted.

Step 3. Alignment of the stirring member back to the spoon configuration.

The stirring member 9 is again configured as a spoon just for a few seconds only to allow the user discover a spoon tool when opening the machine, ready to be used for consumption of the prepared product, and not a whisk from which he would need to remove the product typically remaining blocked between the wires.

Some of the main advantages of the system, stirring member and method according to the present invention are now indicated in what follows.

The stirring member configuration allows simplifying the operation of the machine by the user, still offering the possibility to prepare a large range of products, from ice cream to whipped yoghourt, for example.

Additionally, it allows in the case of making whipped yoghourt, to avoid the well-known problems of the product remaining inside the whisk wires and which is difficult to remove afterwards, by simply turning back the stirring member 9 to the spoon configuration during the last few seconds of the preparation.

Additionally, it allows in the case of making ice cream, foaming very efficiently the preparation by adopting a whisk shape before freezing, in order to include a high amount of overrun in the product, before going back to the spoon shape configuration for the rest of the recipe.

Although the present invention has been described with reference to preferred embodiments thereof, many modifications and alternations may be made by a person having ordinary skill in the art without departing from the scope of this invention which is defined by the appended claims.

The invention claimed is:

1. A method for preparing a food product, the method comprising:

rotating a stirring member inside a container holding ingredients of the food product; and varying a direction of rotation of the stirring member so that the stirring member adopts a different configuration depending on a type of the food product prepared in the container, the stirring member comprising a main stirring member and one or more rotating stirring bodies rotatable with respect to the main stirring member, the stirring member adopting a configuration selected from the group consisting of (i) a spoon where the one or more rotating stirring bodies are not deployed, and the spoon configured for consuming the prepared food product; and (ii) a whisk where the stirring member is deployed, the main stirring member and the one or more rotating stirring bodies being rotated with respect to each other, wherein the main stirring member has an axis of rotation, wherein each of the one or more rotating bodies is connected to the main stirring member by an upper connection and to each other at a lower connection point that are both on the axis of rotation of the main stirring member, the one or more rotating stirring bodies comprise a first rotating stirring body and a second rotating stirring body; movement between the first rotating stirring body and the main stirring member is defined and guided by a primary pin attached to the first rotating stirring body, wherein the primary pin moves inside a primary slot in the main stirring member; and movement between the second rotating stirring body and the first rotating stirring body is defined and guided by a secondary pin attached to the second rotating stirring body, wherein the secondary pin moves inside a secondary slot in the first rotating stirring body.

2. The method according to claim 1 wherein the direction of rotation of the stirring member is varied a plurality of times during a recipe preparation of a certain type of product, as a function of the type of product.

3. The method according to claim 1 comprising controlling the configuration adopted by the stirring member and/or a rotational speed of the stirring member and/or an amount of time the configuration and/or the rotational speed are maintained.

4. The method according to claim 1 comprising blocking a final configuration of the stirring member at the end of the preparing of the food product.

5. The method according to claim 4 wherein the final configuration blocked in the stirring member is the spoon.

6. The method according to claim 1 wherein an angular travel of the one or more rotating stirring bodies with respect to the main stirring member is defined as a function of an amount of air incorporated in the prepared food product.

7. The method according to claim 1 wherein the stirring member comprises three or more rotating stirring bodies rotatable with respect to the main stirring member.

8. The method according to claim 1 wherein in the spoon configuration, the one or more rotating stirring bodies are aligned with respect to the main stirring member such that no relative displacement angle exists between the main stirring member and the one or more rotating stirring bodies.

9. The method according to claim 1 wherein in the whisk configuration, the one or more rotating stirring bodies are displaced at an angle from the main stirring member.

* * * * *